Patented Dec. 6, 1949

2,490,444

UNITED STATES PATENT OFFICE 2,490,444

ALKYLATED AROMATIC COMPOUNDS OF IMPROVED COLOR FROM IMPURE STARTING MATERIALS

Eduard Cornelis Kooijman and Joannes Hubertus Antonius Höing, Amsterdam, Netherlands, assignors to Shell Development Company, San Francisco, Calif., a corporation of Delaware No Drawing. Application June 17, 1947, Serial No. 755,240. In the Netherlands September 13, 1946

3 Claims. (Cl. 260—521)

This invention relates to a process for the production of alkylated aromatic compounds of improved color from impure starting materials. More particularly, the invention relates to an economical method of preparing light-colored mixed alkylation and polymerization products from aromatic compounds and impure olefin fractions, in which process, by a series of successive extractions substantially all of the catalyst, the unconverted starting materials, the alkylating agent, and reaction products are recovered in a relatively pure state. In its most specific embodiment the invention provides an improved process for the production of intermediates from which valuable light-colored lubricating oil additives can be readily obtained, which process comprises contacting polar aromatic compounds containing free hydroxyl and/or carboxyl groups with cracked paraffin fractions under alkylating conditions in a substantially homogeneous liquid phase reaction medium consisting of a liquid catalyst and, by a series of successive solvations, recovering in a substantially pure state the individual components of the reaction mixture after the completion of the alkylation reaction.

While a wide variety of catalytic alkylation processes suitable for the laboratory production of alkylated aromatic compounds are known, such processes have been severely restricted in commercial applications because of the difficulties encountered in similarly adapting the substances commonly employed as catalysts to reactions on a large scale. The substances commonly employed as alkylation catalysts include strong inorganic acids such as sulfuric or phosphoric acids, gases such as boron trifluoride, and solids or in some cases molten mixtures of one or more of the numerous substances known as Friedel-Crafts type catalysts. In general, unless it was desired to produce an almost solid mixture composed mainly of the polymerized unsaturated alkylating agent, the catalysts were employed in what was termed "catalytic amounts," i. e. the catalysts were employed in considerably less than equal parts by weight to the weight of the compound to be alkylated since each mole of an alkylation catalyst usually brings about the attachment to the aromatic nucleus of the alkyl residues of several moles of the alkylating agent. Particularly when the higher homologues of the aromatic compound and the alkylating agent were employed in a more or less impure state, in addition to the difficulties of obtaining intimate contact with and separating the catalysts from large quantities of reactants, the large scale alkylation processes as heretofore accomplished have been characterized by numerous difficulties. The inorganic acids required relatively high reaction temperatures, which, when compounds other than the lowest homologues were employed tended to cause considerable decomposition of the organic reactants. The gaseous catalysts were extremely difficult to recover for re-use and in large scale operations were required in amounts which rendered the process relatively expensive. The Friedel-Crafts type catalysts were usually active in the form of a brown sludge-like suspension of complex organo-metallic addition compounds which were extremely hard to remove from the reaction products. While methods of avoiding this sludge formation have been proposed, such as the employment of the Friedel-Crafts type catalytic material dissolved in a nitroparaffin, the problem of purifying the reaction products still remains, and since it is often necessary to steam distill the alkylated products away from the catalyst-containing solutions, such reactions are not applicable to aromatic compounds in general as many aromatic compounds are not steam-volatile. The present invention will therefore be described with particular reference to its application in the economical production of lubricating oils or lubricating oil additives having improved properties of light coloration and purity from starting materials comprising (1) polar aromatic oxy-compounds, by which term is meant phenols and/or aromatic carboxylic acids containing one or more free hydroxyl and/or carboxyl groups and having the property of combining with metal ions to form metal salts, or of binding metal ions by hydrogen bonds, chelate rings, or the like, to otherwise form non-ionic solvent soluble organometallic compounds; and (2) impure olefin containing mixtures such as the vapor or liquid phase cracking products of high molecular weight paraffins and the like. The process of the invention is, however, not limited to this application, but may be applied with equal advantage to the alkylation of any "alkylatable" aromatic compound, i. e. any aromatic compound containing one or more hydrogen atoms which can be replaced by the alkyl residues of alkylating agents under normal alkylation conditions.

An important object of the present invention is to provide an economical alkylation-polymerization process by which light-colored completely oil-miscible mixtures of alkylated aromatic compounds and polymerized olefins having a high content of free base-binding groups are obtained from the liquid fractions of cracked high molecular weight paraffins and polar aromatic oxy-compounds. Another object of the invention is to provide a method of improving the yields obtained in the alkylation of aromatic compounds with impure alkylating agents. A further object of the invention is to provide an efficient separation process for the reaction mixtures obtained by contacting an alkylating agent with an aromatic compound under alkylating conditions in a substantially homogeneous liquid phase reaction medium comprising antimony trichloride by which the components can be recovered in a relatively high state of purity. Still other objects and advantages of the process will be apparent from the following description.

In the copending application of Harco Jacob Tadema, Serial No. 750,868, filed May 27, 1947, is described and claimed an alkylation process which eliminates many of the disadvantages common to alkylation reaction processes heretofore employed when adapted to large scale preparations. According to the Tadema process, aromatic compounds are contacted with the alkylating agent while dissolved in sufficient amounts of certain molten catalytic materials to form a substantially homogeneous reaction medium containing a liquid catalyst comprising one or more trihalides of the elements of the nitrogen family, group V-B of Mendeleeff's Periodic Table, which are stable in the liquid state under normal pressures at temperatures between about 50° C. and 250° C. In accordance with the Tadema process particularly good yields of the alkylated aromatic compounds can be obtained by employing cracked paraffin fractions as alkylating agents, conducting the alkylation reaction in a solution of molten antimony trichloride and, if desired, adding a relatively small quantity of gaseous hydrogen chloride or a similar catalyst activator. The reaction products are then allowed to cool and stratify. The lower layer so formed consisting mainly of antimony trichloride may be removed and reemployed in subsequent reactions. The upper layer is separated by distillation, which may be preceded by the addition of an organic solvent and the removal by extraction with an ionic solvent such as aqueous hydrochloric acid of the small amounts of suspended or dissolved antimony trichloride.

While the alkylation process described and claimed in the Tadema application is productive of good yields of alkylated aromatic compounds, certain difficulties are introduced by the reuse of the antimony trichloride as described above. In the subsequent alkylations the reaction products become increasingly darkened by the accumulation of dark colored impurities. During the separation of the reaction products of each alkylation reaction by the usual separation procedures, small amounts of highly colored impurities as well as some alkylated aromatic compounds remain dissolved in the essentially inorganic layer of antimony trichloride. The chemical nature of these impurities is such that the extraction of the lower layer, consisting of an essentially inorganic solution, with the non-ionic solvents commonly employed for such operations does not result in the removal of said impurities, and the continued reemployment of the impure antimony trichloride in further conversion reactions results in the formation of additional amounts of impurities in the products of each subsequent operation.

It has now been discovered that by separating the alkylation reaction products by a succession of selective extractions to remove the various components thereof in a particular order, substantially all of the alkylated aromatic compounds and the antimony trichloride as well as the main portion of the unconverted reactants can be freed of the colored impurities and can be economically separated and recovered in a relatively pure state. The production of valuable light-colored alkylation-polymerization products from low-cost starting materials in yields approaching theoretical amounts obtainable can thus be accomplished with substantially no loss of the catalyzing, accelerating or unreacted starting materials, thereby resulting in a greatly reduced over-all cost for the production of substantially pure products.

The present invention therefore provides an improved method of separating in a relatively pure state the various components of the mixed reaction products formed by contacting an aromatic compound and an alkylating agent under alkylating conditions in a substantially homogeneous liquid antimony trichloride solution by a particular series of successive extractions with selective solvents, and provides a process for the economical alkylation of aromatic compounds with liquid olefin fractions obtained by cracking high molecular weight paraffins, which comprises contacting the reactant under alkylating conditions in sufficient liquid antimony trichloride to form a substantially homogeneous liquid reaction medium, treating the mixed reaction products with a liquid aliphatic hydrocarbon solvent, dissolving and separating in said aliphatic hydrocarbon solvent at least a portion of the alkylated aromatic compounds and polymerized olefins, mixing the remaining antimony trichloride with a substantially equal volume of a liquid aromatic hydrocarbon solvent, treating the resultant mixture with a volatile ionic solvent immiscible with the aromatic solvent but miscible with antimony trichloride, thereby dissolving and separating antimony trichloride as a solute in the ionic solvent while leaving the colored impurities dissolved in the aromatic solvent.

Certain variations and modifications of procedure may suitably be employed in accomplishing the stepwise separation of the alkylation reaction products in accordance with the present process. For example, the treatment with the aliphatic hydrocarbon solvent may precede or follow an initial separation of the substantially organic and the substantially inorganic layers which will be formed when the mixed reaction products are allowed to cool; the mixed reaction products may be sufficiently cooled to cause the separation of a third or solid phase, which, particularly in the case of reactants having a melting point substantially lower than that of antimony trichloride, will consist of substantially pure antimony trichloride and may advantageously be removed by filtration or similar methods before the remaining components are separated, or still other variations may be employed to particularly adapt the process to individual applications.

The preferred alkylation and separation procedure, particularly when polar aromatic oxy-compounds such as salicylic acid are to be alkylated by impure olefin fractions, comprises the following steps: (1) The olefin fraction is slowly added to a solution containing the polar aromatic compound in at least about 3.5 times its weight of antimony trichloride or, in any case, in sufficient antimony trichloride to dissolve substantially all of the polar aromatic compound at a temperature high enough to liquefy the combined materials, but below the temperature at which the resulting liquid boils rapidly or the components thereof undergo substantial decomposition. In many cases the alkylation reaction will proceed more rapidly and smoothly if the addition of the olefin mixture is followed by the slow addition of a catalyst promoter such as gaseous hydrogen chloride, or if ferric chloride or water in amounts of not more than about 1/3 of the weight of the antimony trichloride employed are incorporated in the reaction medium. (2) After the alkylation reaction is completed the reactants are allowed to cool sufficiently to cause the separation of two immiscible liquid phases, but not sufficiently to cause the separation of a solid phase, and the substantially organic layer, the upper layer, is separated by decantation. (3) The remaining lower layer is extracted with portions of a liquid aliphatic hydrocarbon solvent such as an aromatic-free gasoline fraction having a suitable boiling range, for example, a gasoline fraction boiling between about 60 and 80° C., until substantially all of the alkylated aromatic compounds and polymerized olefins are removed. The aliphatic hydrocarbon solution so formed is then added to the organic layer which was first separated as described in step 2. (4) The remainder of the lower layer, after the extraction described in step 3, which now comprises antimony trichloride, small amounts of unconverted polar organic compounds and the dark colored impurities which were contained in the olefin fraction or formed during the alkylation reaction, is mixed with a substantially equal volume of a liquid aromatic hydrocarbon, preferably an alkylated aromatic hydrocarbon which is a liquid at the temperatures employed such as xylene, for example. The mixture so obtained is then extracted with sufficient portions of a volatile ionic solvent such as an aqueous hydrochloric acid, which is miscible with antimony trichloride but immiscible with the alkylated aromatic solvent employed to dissolve the antimony trichloride. (5) The aliphatic hydrocarbon solution mixed with the first formed organic layer as described in step 3 is extracted with portions of a similar ionic solvent until all of the antimony trichloride is removed. The remaining aliphatic hydrocarbon solution is slightly oily, has a clear light yellow color and contains the alkylation and polymerization products, the unconverted olefins and minor amounts of the unconverted polar organic compound. The ionic solvent solution of the antimony trichloride formed by the extraction is combined with the similar solution obtained and described in step 4 above.

The above-described extractions or separations may be conducted in any of the various types of apparatus suitable for intimately mixing and subsequently separating immiscible liquid solutions, of which the apparatus employing the countercurrent principle of contacting and separating the liquids have been found to be particularly suitable. The apparatus employed should, of course, be constructed or lined with acid resistant materials when corrosive substances are employed as the catalyst activator or as a selective solvent.

The selective solvents employed in successively extracting the alkylation reaction products may suitably consist of various individual compounds or mixtures. The aliphatic hydrocarbon solvent may comprise one or a number of aliphatic hydro-carbons such as propane, butanes, pentanes, hexanes, and the like as well as various amounts of other non-ionic essentially aliphatic solvents such as ethers, esters, and the like which are normally liquid at the extraction temperatures employed. The particularly preferred liquid aliphatic hydrocarbon solvents comprise individual and/or mixed non-ionic aliphatic solvents which have solubility properties similar to those of a non-aromatic gasoline fraction having a boiling range of from about 60° C. to 80° C. The aromatic hydrocarbon solvent may comprise one or more homologues of benzene which are non-viscous liquids at the extraction temperatures employed such as benzene, toluene, the xylenes, the mono, di, or triethyl benzenes, propylbenzenes, and the like. In each particular case the aromatic hydrocarbon solvent is preferably selected from non-ionic liquid aryl compounds or mixtures thereof in which the dark colored alkylation impurities are readily soluble, and which are liquid at the extraction temperatures employed. Xylene or other alkylated aromatic liquid hydrocarbons having similar properties of solubility have been found to form particularly suitable aromatic hydrocarbon solvents for employment in the present process. The volatile ionic solvent may comprise any volatile liquid mixture which is substantially immiscible with the non-ionic solvents described above and preferably consists of a water solution containing a volatile inorganic acid. Hydrochloric acid solutions containing about 20% by weight of hydrochloric acid, i. e., the hydrochloric acid-water azeotropic mixture boiling at 107° C., has been found to be particularly suitable in this connection.

The further separation and purification of the various solutions so obtained may be readily accomplished by the well known separation procedures, and widely varying procedures may be employed for the further separation depending upon the particular use to be made of the various compounds so isolated. It has been found that, by treating the combined aqueous ionic solvent solutions of antimony trichloride obtained as described in steps 4 and 5 with a small amount of activated charcoal, a clear yellow solution of antimony trichloride is obtained, from which substantially all of the volatile ionic material as well as the antimony trichloride employed may be recovered in a relatively pure state by a simple distillation at normal pressure.

Similarly, the aliphatic hydrocarbon solution may be concentrated, by a steam distillation for example, to form a light yellow colored synthetic oil or lubricating oil additive. Alternatively, the solution may be freed of the small amounts of unconverted polar organic compounds by various suitable extraction processes, for example, the solutions obtained from the alkylation products of an aromatic carboxylic acid can be separated by extracting the hydrocarbon solution with a weakly alkaline aqueous solution (a sodium carbonate solution, for example) thereby removing the acidic components in the form of their sodium salts in the aqueous layer, after which the recovery of the alkylated aromatic compounds, the polymerized olefins and the unconverted olefins in a substantially pure state may be accomplished by a subsequent distillation of the remaining organic layer.

In addition to its particular value in connection with the alkylation of polar aromatic compounds, the present invention may advantageously be applied to the alkylation of alkylatable aromatic compounds such as any mono- or poly-nuclear aromatic compounds containing one or more hydrogen atoms sufficiently active as to be available for replacement by the alkyl residue of an alkylating agent under the normal alkylating conditions such as naphthalene, the mono- or poly-cycloalkylbenzenes, the mono- or poly-alkylarylbenzenes, the mono- or poly-cycloalkylarylbenzenes, the mono- or poly-alkylnaphthalenes, the mono- or poly-arylnaphthalenes, the mono- or poly-cycloalkylnaphthalenes, the mono- or poly-alkylarylnaphthalenes, the mono- or poly-cycloalkylarylnaphthalenes, the anthracenes, the alkyl phenyl ethers, the alkoxybenzenes, and their homologues and analogues.

Illustrative of the particularly valuable polar aromatic oxy-compounds which may be alkylated in accordance with the present process to form particularly valuable lubricating oils and additives are the di- or mono-cyclic aromatic or alkylaromatic carboxylic acids, particularly those containing one or more hydroxyl groups, and the phenols including such individual representative compounds as salicylic acid, phenol, 4-hydroxybenzoic acid, o-, m- and p-cresols, benzoic acid, 2,3-dihydroxybenzoic acid, 2,4-dihydroxybenzoic acid, 2,5-dihydrophenylacetic acid, beta-phenylpropionic acid, n-phenylbutyric acid, beta-naphthoic acids, phthalic acid, xylidinic acids, cumideric acids, 4-hydroxy-1,3-dicarboxybenzene, resorcinol catechol, oxy-phenols, 4-hydroxybenzoic acid, 2,6-dihydroxybenzoic acid, 2,4-dihydroxybenzoic acid, 3,4-dihydroxybenzoic acid, 3,5-dihydroxybenzoic acid, 2,3-dimethylbenzoic acid, 2,4-dimethylbenzoic acid, 2,5-dimethylbenzoic acid, 2,6-dimethylbenzoic acid, 3,4-dimethylbenzoic acid, 3,5-dimethylbenzoic acid, o-, m- and p-ethylbenzoic acids, m-hydroxybenzoic acid, o- and p-isopropylbenzoic acids, o-, m- and p-methylbenzoic acids, o-, m- and p-phenylbenzoic acids, o- and p-propylbenzoic acids, o-, m- and p-propylphenols, o-, m- and p-phenylphenols, o-, m- and p-methylphenols, o-, m- and p-ethylphenols, and their homologues and analogues.

Any of the numerous types of compounds commonly employed as alkylating agents for the catalytic alkylation of aromatic compounds are suitable for the present process. The alkylating agents may be employed as the individual substances, components of mixtures or solutions, or may be formed in situ during the alkylating operation by the reaction of suitable materials under the alkylating conditions employed in the process.

Compounds or mixtures rich in compounds containing olefinic linkages between two or more carbon atoms which are not members of a conjugated ring system and which have boiling points above about 50° C. under atmospheric pressure form the preferred alkylating agents for employment in accordance with the present process. Illustrative examples of this preferred subclass of alkylating agents include such particular compounds and mixtures of olefins such as the hexylenes, decylenes and cetenes, cyclo-olefins such as cyclohexylene, olefin-containing mixtures such as the vapor or liquid phase cracking products of paraffin waxes having a boiling range above about 50° C., olefinic alcohols such as allyl, crotyl and cinnamic alcohols, olefinic carboxylic acids such as maleic, oleic and linoleic, unsaturated aldehydes such as acrolein or crotonaldehyde, unsaturated esters such as those contained in rape-seed oil or soya bean oil, and their homologues and analogues which have boiling points above about 50° C.

The most particularly preferable alkylating agents are compounds containing one or more olefinic linkages which are normally liquids boiling substantially above room temperature, i. e., compounds of the general formula $C_nH_{2n-y}$ in which $n$ is an integer greater than 6 and $y$ is zero or the integers 2 or 4. The particularly preferable alkylating agents include such individual representative compounds as hexene, cyclohexene, heptene, octylene, decylene, hexadecylene, octadecylene, triacontene, hexadiene, heptadiene, as individual substances or as the primary components of mixtures such as the vapor or liquid phase cracking distillates of paraffin wax, and the like.

In many cases the present alkylation process is rapid and productive of high yields of alkylated materials when trihalides of the elements of group V-B of the periodic table are employed in the liquid state and in the substantial absence of any catalyst activator or promoter. This is true even in the case of alkylating polar carboxyl and hydroxyl substituted aromatic compounds with relatively high boiling olefins. However, the rate of the alkylation reaction may be increased by the employment of a catalyst activator such as ferric chloride, hydrochloric acid or water, which may be combined with, and introduced into the alkylation reaction with the liquefied catalyst, or, in the case of vaporous activators, may be continuously introduced into the liquid reaction medium during the alkylation reaction, preferably following the addition of the alkylating agent.

The molar ratios of the aromatic compound to the alkylating agent may be varied over wide limits, thereby controlling to a certain extent the degree of alkylation obtained in the principal reaction product. The alkylation reaction is usually accompanied by a certain amount of polymerization of the alkylating agent, depending primarily upon the procedure and rate of introduction of the alkylating agent into the reaction mixture, and, to a certain extent, upon the reaction temperature. If, for example, it is desirable to cause a maximum condensation of the monomeric alkylating agent with the aromatic compound, the alkylating agent is preferably introduced slowly into the reaction mixture at a temperature of between about 90° C. and 125° C. On the other hand, when the production of polymeric substances and aromatic compounds alkylated by polymeric molecules of the alkylating agent is desired, the alkylating agent should be entirely introduced before the mixture is brought to the reaction temperature, or the aromatic compound should be slowly added to the alkylating agent and catalyst at the desired temperature. The polymerization reaction is, in general, further increased by the employment of reaction temperatures below about 95° C.

In one of its most important applications the process provides an improved method of preparing lubricating oils, lubricating oil additives, washing agents, siccatives, and the like. In this connection it is preferable to employ the alkylating agent in a considerable excess of the stoichiometric amount required for the total number of possible alkylating places in the aromatic compound. When polar aromatic oxy-compounds such as salicylic acid are alkylated by the present process with an excess of olefins containing from 6 to 20 carbon atoms per molecule, the resultant alkylation and polymerization products are exceptionally effective synthetic lubricating oils. In addition, the alkylation and polymerization products so obtained readily form improved metal salt-containing lubricants or lubricant additives having a high metal content upon treatment with a polyvalent metal. Such lubricant additives increase the stability to oxidation or decomposition at high temperatures, promote cylinder cleanness in combustion engines, counteract the deposition of carbonaceous products on the pistons and in the piston ring grooves, and restrict the general wear and tear due to corrosion.

In order to more clearly illustrate the process and advantages of the invention, the alkylation of a polar aromatic oxy-compound with an impure olefin mixture will be described in detail. However, the present invention is in no way to be interpreted as restricted to the particular materials and conditions so described.

*Example*

The alkylation of salicylic acid with a mixture of olefins containing from about 9 to 16 carbon atoms per molecule obtained by the cracking of a solid paraffin wax:

In a ceramic-lined reactor 7.5 kilograms of salicylic acid were dissolved in 45 kilograms of molten antimony trichloride. The olefin mixture was slowly introduced with stirring over a period of 2½ hours while the temperature was maintained at approximately 110° C. Dry gaseous hydrogen chloride in an amount of 1500 liters measured at standard conditions was then introduced over a period of 3 hours and the stirring of the reaction mass at constant temperature was continued for an additional hour.

The reaction mass was allowed to cool to about 40° C., and at this temperature two immiscible layers were formed. The upper layer contained approximately 75% of the alkylation products, about 20% of the antimony trichloride, substantially all of the unconverted olefins, and small amounts of unconverted salicylic acid. The lower layer contained the remainder of the antimony trichloride, unconverted salicylic acid, and small amounts of dark colored impurities.

The layers were separated and, while maintained at a temperature above the solidifying temperature of the antimony trichloride solutions, the lower or inorganic layer was extracted with three 10-liter portions of a gasoline fraction boiling between about 60° C. and 80° C. The gasoline solution of the aliphatic hydrocarbon-soluble organic components of the lower layer was combined with the upper, or organic, layer formed in the initial phase separation of the reaction products. The resultant gasoline solution containing primarily the alkylation products, the unconverted olefins, suspended and dissolved antimony trichloride, and minor amounts of unconverted salicylic acid was then extracted with portions of the hydrochloric acid-water azeotropic mixture boiling at 107° C. and containing 20% by weight of hydrochloric acid amounting to a total of 5.5 kilograms. The remaining gasoline solution of the organic compounds (solution A) had a clear yellow color and was slightly oily in character.

The gasoline-insoluble components of the inorganic layer remaining in the antimony trichloride after the extraction with gasoline were diluted with an equal volume (approximately 20 liters) of xylene. The binary liquid system so formed was then extracted with portions of the 20% aqueous hydrochloric acid solution amounting to 17 kilograms. The dark colored impurities and unconverted salicylic acid remained in the xylene solution and formed a very dark oily liquid, while the antimony trichloride was completely dissolved in the aqueous solution.

The aqueous hydrochloric acid solutions obtained by the extraction of the respective gasoline and the xylene containing mixtures were combined and treated with activated carbon (Norite) to remove the traces of impurities which gave the solution a dark color. After filtering off the activated carbon, a clear pale yellow solution containing about 60% by weight of antimony trichloride remained. By a distillation at atmospheric pressure to remove the hydrochloric acid and the water, about 98% of the total antimony trichloride employed in the process was recovered in a substantially pure form.

The main portion of the unconverted salicylic acid was recovered from the dark oily xylene solution by saponifying the solution with 20% aqueous sodium hydroxide and separating the lower or aqueous layer of saponification products. Upon acidification, filtration and washing with water, approximately 65% of the unconverted salicylic acid was recovered.

In order to determine the percentage of the starting materials actually recovered in the form of alkylated salicylic acid and polymerized olefins, the gasoline solution of the organic components (solution A) was freed of unconverted reactants and solvent and found to consist of 35 kilograms of clear light yellow colored alkylation polymerization products having an acid number of 61, corresponding to a yield of 70% based on the amount of salicylic acid employed. In a like manner yields of 90% and 80%-85%, respectively, were obtained by alkylating salicylic acid in accordance with the present process with pure cetene-1 and cracked distillate consisting of mixed olefins containing from 5 to 8 carbon atoms per molecule.

A lubricating oil additive was prepared from a gasoline solution obtained by alkylating salicylic acid under identical conditions and having the composition of solution A above, in the following manner: The solution was freed of gasoline and unconverted olefins by distillation, and the light yellow colored residue was saponified with 20% aqueous sodium hydroxide. The binary saponification mixture was then treated with a concentrated aqueous solution of calcium hydroxide at an elevated temperature. The slightly emulsified mixture so formed was caused to separate into two distinct layers by the addition of a small amount of ethyl alcohol. The upper layer was removed, washed with water, and concentrated by a vacuum steam distillation. The residue so obtained was dried and found to consist of a clear oily liquid having a reddish cast which was completely miscible with lubricating oils in all proportions and which contained 2% by weight of calcium. By acidifying the lower layer, filtering and washing the precipitate with water, a small amount of substantially pure salicylic acid was obtained.

The invention claimed is:

1. In the process of alkylating a hydroxybenzenecarboxylic acid by reacting the acid with an olefin in the presence of sufficient molten antimony trichloride to substantially dissolve the reactants, the improvement providing a more complete separation of the materials employed and formed in the reaction, which improvement comprises, separating the organic and inorganic phases formed by said materials when the reaction is terminated and extracting from the inorganic phase, with a liquid aliphatic hydrocarbon, the aliphatic hydrocarbon-soluble components prior to extracting with an aqueous inorganic acid, the antimony trichloride employed in the reaction.

2. In the process of alkylating a salicylic acid by reacting the acid with an olefin in the presence of sufficient molten antimony trichloride to substantially dissolve the reactants, the improvement providing a more complete separation of the materials employed and formed in the reaction, which improvement comprises, separating the organic and inorganic phases formed by said materials when the reaction is terminated and extracting from the inorganic phase, with a liquid aliphatic hydrocarbon, the aliphatic hydrocarbon-soluble components prior to extracting, with an aqeous inorganic acid, the antimony trichloride employed in the reaction.

3. In the process of alkylating salicylic acid by reacting the acid with an olefin in the presence of sufficient molten antimony trichloride to substantially dissolve the reactants, the improvement providing a more complete separation of the materials employed and formed in the reaction, which improvement comprises, separating the organic and inorganic phases formed by said materials when the reaction is terminated, extracting from the inorganic phase, with a mixture of aliphatic hydrocarbons boiling from about 60 to about 80° C., the aliphatic hydrocarbon-soluble components, and diluting the remainder of the inorganic phase with a substantially equal volume of a liquid benzene hydrocarbon prior to extracting, with an aqueous inorganic acid, the antimony trichloride employed in the reaction.

EDUARD CORNELIS KOOIJMAN.
JOANNES HUBERTUS ANTONIUS HÖING.

REFERENCES CITED

The following references are of record in the file of this patent:

UNITED STATES PATENTS

| Number | Name | Date |
|---|---|---|
| 1,998,750 | Bruson et al. | Apr. 23, 1935 |
| 2,001,767 | Bruson et al. | May 21, 1935 |
| 2,347,547 | Finley | Apr. 25, 1944 |
| 2,356,043 | Finley | Aug. 15, 1944 |
| 2,378,733 | Sensel | June 19, 1945 |
| 2,397,498 | May | Apr. 2, 1946 |

OTHER REFERENCES

Gatterman: "Practical Methods of Org. Chem." (Schober et al., MacMillan, 3rd ed., 1923), pp. 43–49.